United States Patent
Rumreich et al.

(10) Patent No.: US 6,177,962 B1
(45) Date of Patent: Jan. 23, 2001

(54) APPARATUS AND METHOD FOR PREVENTING OVERSATURATION OF CHROMINANCE SIGNALS

(75) Inventors: Mark Francis Rumreich; Mark Robert Zukas; Ronald Thomas Keen, all of Indianapolis, IN (US)

(73) Assignee: Thomson Licensing S.A., Boulogne (FR)

( * ) Notice: Under 35 U.S.C. 154(b), the term of this patent shall be extended for 0 days.

(21) Appl. No.: 09/343,622

(22) Filed: Jun. 30, 1999

(51) Int. Cl.[7] ................ H04N 9/68; H04N 5/52
(52) U.S. Cl. ............ 348/648; 348/624; 348/663; 348/679
(58) Field of Search .................... 348/624, 645, 348/647, 648, 663, 713, 678, 679; H04N 5/21, 9/68, 9/77, 5/52

(56) References Cited

U.S. PATENT DOCUMENTS

| | | | |
|---|---|---|---|
| 4,054,905 | 10/1977 | Harwood et al. | 358/27 |
| 4,316,213 | 2/1982 | Wharton et al. | 358/11 |
| 4,359,756 | 11/1982 | Schneider et al. | 358/27 |
| 4,447,826 | 5/1984 | Lewis, Jr. et al. | 358/27 |
| 4,500,910 | 2/1985 | Harwood | 358/28 |
| 4,573,069 | 2/1986 | Lewis, Jr. | 358/27 |
| 4,602,276 | 7/1986 | Fling et al. | 358/27 |
| 4,604,645 | 8/1986 | Lewis, Jr. | 358/27 |
| 4,630,102 | 12/1986 | Wargo et al. | 358/27 |
| 4,635,102 | 1/1987 | Bolger | 358/27 |
| 4,962,417 | 10/1990 | Schultz | 358/27 |
| 5,619,280 | 4/1997 | Yamashita | 348/645 |
| 5,696,710 | 12/1997 | Hague et al. | 364/745.02 |

Primary Examiner—Sherrie Hsia
(74) Attorney, Agent, or Firm—Joseph S. Tripoli; Paul P. Kiel

(57) ABSTRACT

A chrominance signal C is separated (30) into component vectors U and V and coupled via respective paths each including a controllable gain amplifier (60,62) to respective outputs (56,58). A chroma overload protection unit (50) is provided including a saturation calculator (78) determines the saturation of the vector components and provides a saturating indicating signal to a gain characteristic unit (72) which jointly controls the gain of the amplifiers to proportionally limit the vector component magnitudes as a given function of the saturation indicating signal on a pixel by pixel basis thereby providing output component vectors (U,V) exhibiting no tint shift upon limiting conditions. In a digital embodiment, the amplifiers are implemented by multipliers (512,522) having outputs subjected to symmetrical rounding (514,524), saturation is calculated (78A) by an approximation to the square root of the sum of squares of the vector components, and plural look up tables (72A) are provided for generating the gain control signal G.

13 Claims, 7 Drawing Sheets

APPARATUS AND METHOD FOR PREVENTING OVERSATURATION OF CHROMINANCE SIGNALS

FIELD OF THE INVENTION

This invention relates to a video signal processing apparatus, and in particular, to a chroma overload protection apparatus.

BACKGROUND OF THE INVENTION

Chroma overload circuits are commonly used to prevent oversaturated chroma which may result from "channel impairments" in a video system such as tuner tilt, multipath propagation effects, noise or the like.

A conventional form of chroma overload protection circuit operates by adjusting the gain of the chroma signal in response to an average chroma level during active video time intervals after automatic chroma control (ACC) processing. FIG. 1 illustrates an example of such a system. The conventional system of FIG. 1 comprises series connected ACC unit 10 and chroma overload unit 20 (each outlined in phantom) followed by chroma signal separator circuit 30 which separates the chroma signal into its component vector components, U and V for further processing (e.g., demodulation to baseband and matrixing to provide baseband color difference output signals R-Y and B-Y).

ACC unit 10 comprises controllable gain amplifier 12 to which a chroma input signal is applied and a feedback path from the output of amplifier 12 to control input 14 thereof. The feedback path comprises a series connection of burst gate 16 and automatic chroma control circuit (ACC) 18. Chroma overload circuit 20 is also feedback controlled and comprises controllable gain amplifier 22 which is coupled at the input thereof to receive the ACC controlled chroma from unit 10 and is provided with feedback to control input 24 thereof via a series connection of gate 26 and average detector 28. Chroma signal separation into its component vectors is performed after chroma ACC and chroma overload protection by chroma signal separator circuit 30 connected to the output of overload circuit 20 to provide separated chroma vector component output signals U and V.

In the operation of ACC unit 10, burst gate 16 passes the color burst component of the chroma signal to ACC unit 18 which compares the burst amplitude with a reference level and provides a control signal to control input 14 of amplifier 12 to adjust the chroma signal amplitude to a predetermined level. In this way, the amplitude of the overall chroma signal C is stabilized at a predictable value based on the burst amplitude relative to the reference or desired level. If the burst amplitude increases, the gain of amplifier 12 decreases to thereby stabilize the average chroma signal level. Some smoothing may be included in ACC unit 18 to prevent noise which may be present on the gated burst signal from disturbing the regulated chroma output signal level.

In the operation of chroma overload circuit 20, gate 26 is open during the active video trace interval and closed otherwise to thereby pass only chroma to average detector 28. Recall that ACC detector 18 serves to regulate the chroma level based on the gated burst amplitude. Overload detector 28 serves to provide chroma overload limiting based on the average chroma level (rather than the burst level). For this purpose, the time constant of average detector 28 as well as the gain characteristic of gain controlled amplifier 22 determine the behavior of the overload circuit. In some systems of this type, the attack and decay time constants of detector 28 may be different, and detector 28 may be implemented as a so-called "leaky peak detector" (e.g., a capacitor with a fast charging circuit and a parallel connected "leak" resistor to provide a relatively slow discharge time constant).

SUMMARY OF THE INVENTION

It is herein recognized that a problem exists with conventional chroma overload circuits and that problem relates to the relatively long time constants involved. The response time constant is usually on the order of a video field (e.g., 17 milli-Seconds). This long time constant may have a tendency to reduce visible artifacts associated with modulating the chroma gain. On the other hand, it also may allow instantaneous levels of the chroma signal to exceed desired levels resulting in undesirable oversaturation of the chroma of displayed images.

A further aspect of the problem, as herein recognized, is that in an analog system, "head room" is provided to accommodate this instantaneous chroma signal condition which may cause oversaturation. By contrast, in a digital system, for example, one supporting a CCIR 601/656 interface standard, there may be little "head room" provided for chroma in the system standard. By way of example, in a digital system, chroma levels exceeding the 8-bit (or sometime 10-bit) range for the chroma components (e.g., U and V vector components) may be "hard limited" (e.g., by truncation). Since U and V may be limited separately after demodulation, chroma overload may produce an objectionable tint shift in displayed images.

The problem of chroma overload is further illustrated in the phasor (vector) diagrams of FIGS. 2A and 2B. In the diagram of FIG. 2A there is shown an over-saturated chroma vector C which exceeds a desired saturation limit represented by grid 200, and its constituent component vectors, U and V. FIG. 2B shows the effect of limiting the constituent vectors. In this example, vector U is limited to a magnitude of U-LIM ("LIM" is the limiting value), vector V is not limited. The resultant vector C-LIM has a different angle, and therefore a different tint, than vector C. This can result in a particularly objectionable type of picture artifact to the eye. Imagine, for example, an over-saturated blue object becoming red at the areas of highest saturation.

In accordance with the principles of the present invention, the solution to the problem of chroma tint shifts upon overload of one or more vector components is provided by controlling chroma saturation on a pixel-by-pixel basis. Advantageously, this approach prevents tint shifts on oversaturated pixels. Moreover, this solution also eliminates (not just reduces) visible artifacts associated with larger time-constant methods of modulating the chroma gain.

Chroma overload protection apparatus in accordance with the invention comprises a source for providing a chrominance signal having first and second vector components; a separator, coupled to said source, for separating said chrominance signal into the first vector component and the second vector component; and an overload compensator, coupled to the separator, for adjusting the magnitude of the first and second vector components as a given function of a detected saturation level of the chrominance signal on a pixel by pixel basis.

In a desirable application of the principles of the invention, the compensator comprises a saturation calculator responsive to the first and second vector components for providing a saturation indicating signal converter responsive to the saturation indicating signal for providing a gain control signal; and gain control means, responsive to the gain control signal, for concurrently adjusting the gain of the first vector component in a first signal path and of the second vector component in a second signal path.

A method, in accordance with the invention, for providing chroma overload protection, comprises the steps of: providing a chrominance signal having first and second vector components; separating the chrominance signal into the first vector component and the second vector component; and adjusting the magnitude of the first and second vector components as a given function of a detected saturation level of the chrominance signal on a pixel by pixel basis.

BRIEF DESCRIPTION OF THE DRAWINGS

The foregoing and further features of the invention are illustrated in the accompanying drawings, wherein.

DETAILED DESCRIPTION

Controlling saturation on a pixel-by-pixel basis, in accordance with an aspect of the invention, includes measurement of saturation on a pixel-by-pixel basis. This calculation is best performed, in accordance with the invention, by processing separated or "demodulated" chroma vector components. Accordingly, in the embodiment of the invention of FIG. 3, the chrominance signal after ACC processing in ACC unit 10 is separated into component vectors U and V by chroma separator 30 prior to processing in chroma overload protection circuit 50.

Figure 1:
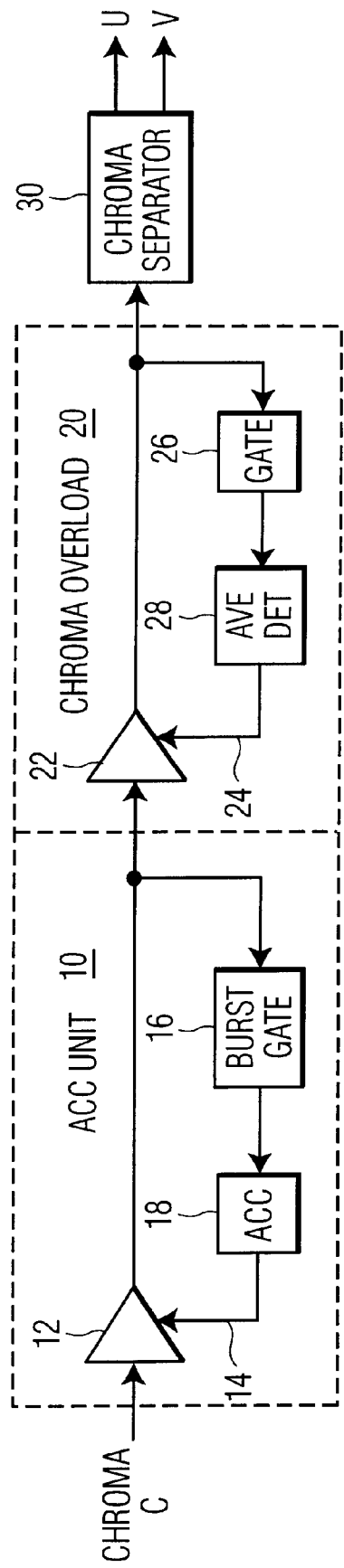
FIG. 1 is a block diagram of a conventional chroma overload system.
Figure 2A:
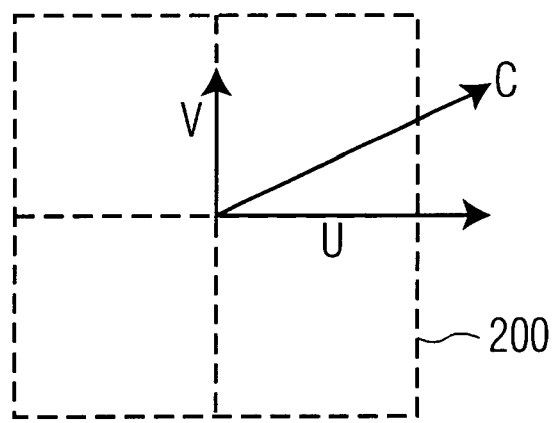
FIGS. 2A and 2B are vector diagrams illustrating the effect on tint of the system of FIG. 1 under chroma overload conditions.
Figure 2B:
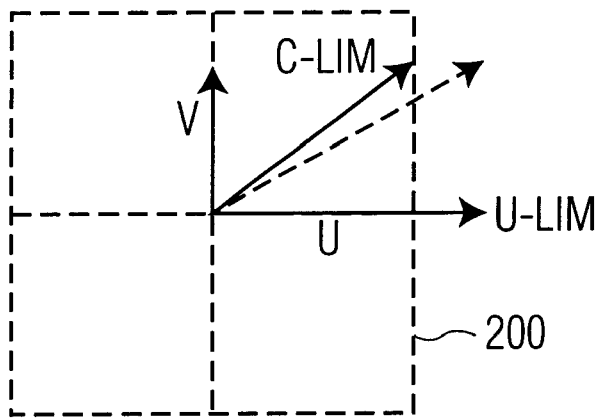
Figure 3:
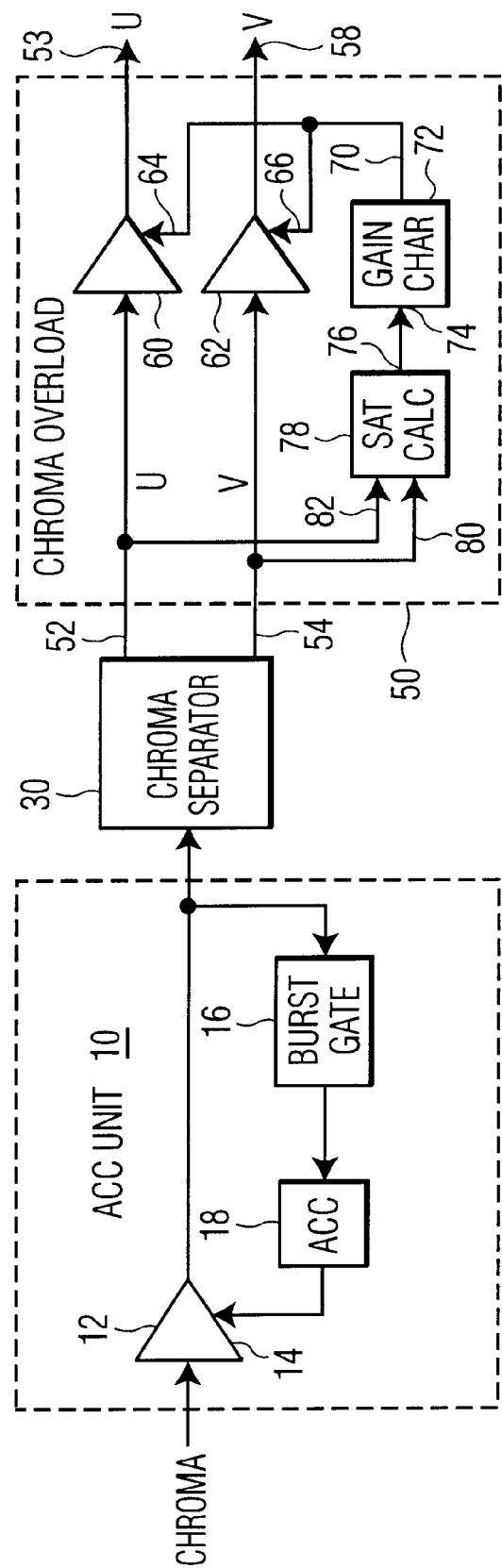
FIG. 3 is a simplified block diagram of chroma overload protection apparatus embodying the invention.

Chroma overload protection circuit 50 (outlined in phantom) in FIG. 3 comprises a pair of inputs 52 and 54 coupled to receive the separated vector components U and V of the chrominance signal C provided by the chrominance signal separator 30. Separator 30 may be of conventional design. For example, separator 30 may be implemented by providing the chrominance signal samples at four times the color subcarrier frequency and separating out the odd samples to provide the vector component U and taking the even samples to provide the vector component V. Inputs 52 and 54 are coupled to respective outputs 56 and 58 by means of respective controllable gain amplifiers 60 and 62 each having respective gain control inputs 64 and 66 connected in common and to output 70 of gain characteristic control circuit 72. Input 74 of gain characteristic control circuit 72 is coupled to output 76 of saturation calculator 78 having respective inputs 80 and 82 coupled to respective outputs 54 and 52 of chroma separator 30 for receiving respective ones of the separated chrominance signal component vectors U and V.

In operation, saturation calculator 78 determines the vector magnitude of the outputs of chroma signal separator 30. Since the component vectors U and V are quadrature related, the chrominance vector C may be reconstructed from its two vector components by forming the square root of the sum of the squares of the component vectors U and V or a suitable approximation thereof (as discussed later). The resultant vector is used to control the gain of the U and V channels (i.e., the gains of amplifiers 60 and 62. Since the gains of both channels are identical, saturation is reduced without affecting tint. The manner in which the magnitude affects the gain is determined by the transfer characteristic of gain characteristic control circuit 72. This transfer characteristic may be tailored to provide either a hard clipping or a soft clipping (or "limiting") characteristic as shown and described later.

Figure 4A:
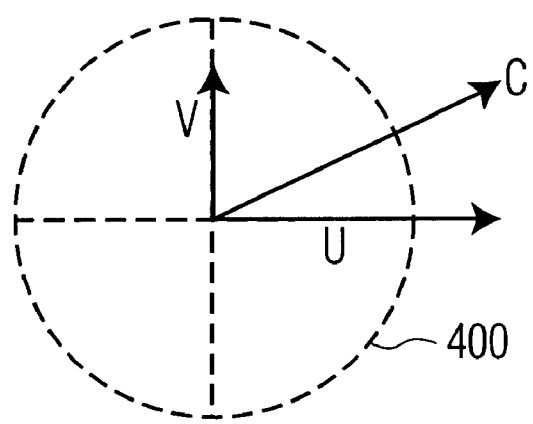
FIG. 4 is a vector diagram illustrating operation of the apparatus of FIG. 3 under chroma over-load conditions.
Figure 4B:
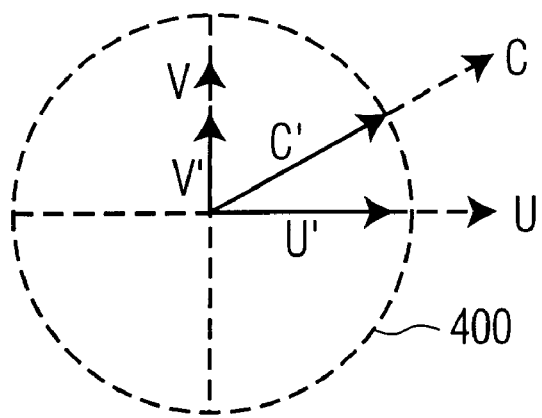

FIGS. 4A and 4B further illustrate how the pixel-by-pixel chroma overload circuit reduces the oversaturated vector C without changing the tint. Based on the magnitude of the vector C provided by ACC unit 10, the gains of the U and V channels are identically adjusted to produce modified U' and V' vector components. The dashed circle 400 in FIG. 4A represents the locus of a desired saturation level. As shown, the chroma vector C is greater than the desired saturation level resulting in its vector component U exceeding the desired saturation level also. Component V is shown to be within the desired range. FIG. 4B illustrates how the reduction of the amplitudes of the U and V vectors in equal proportions (using the gain characteristic of unit 72) to form reduced vectors U' and V' results in a reduction in the vector sum thereof (C') to the desired limiting value represented by dashed circle 400.

Figure 5:
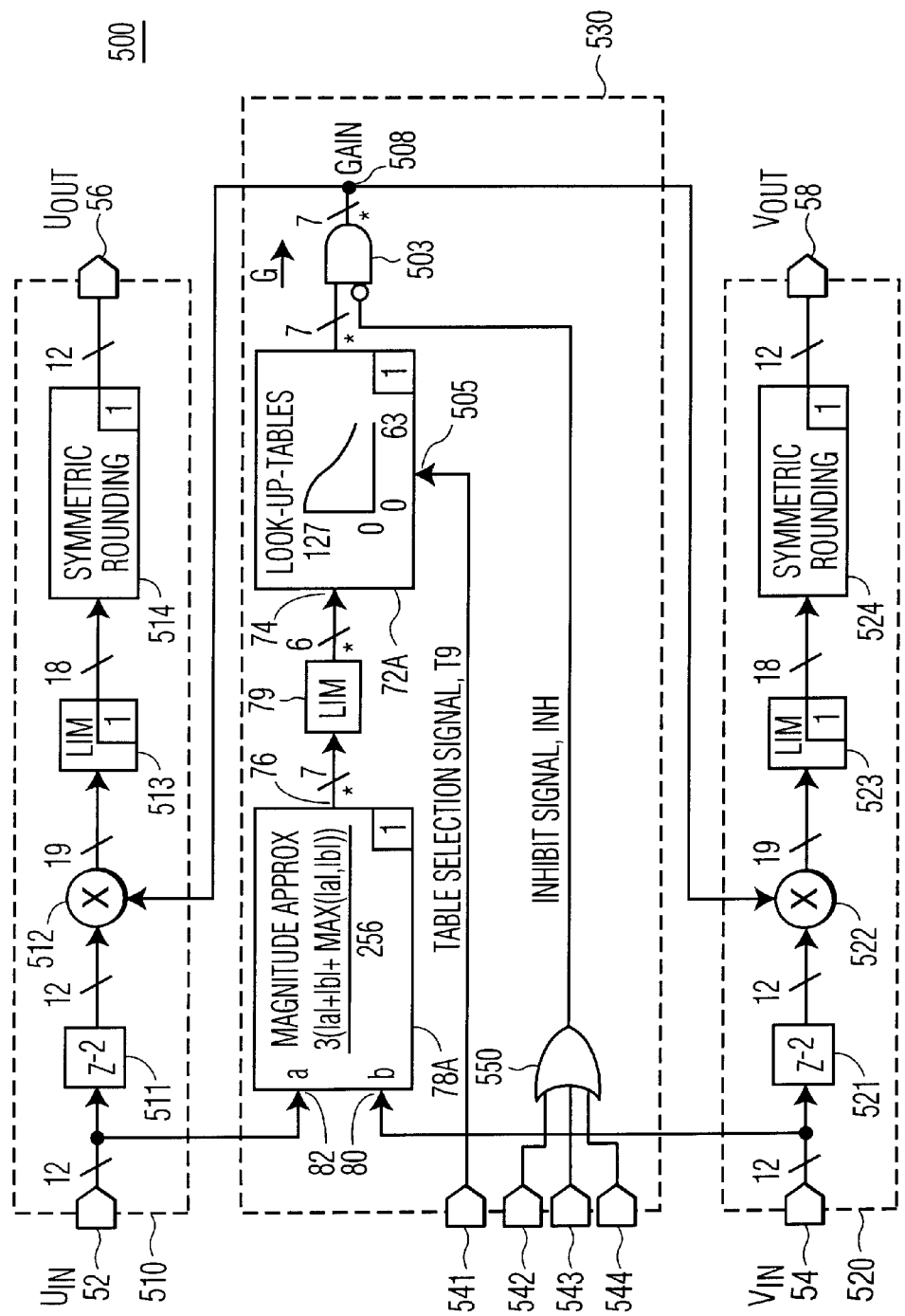
FIG. 5 is a detailed circuit diagram of the apparatus of FIG. 3 and embodying further aspects of the invention.

FIG. 5 illustrates a detailed digital embodiment of the chroma overload apparatus of FIG. 3. In this embodiment a sampling clock frequency of four times the color subcarrier is assumed. Unless noted by an asterisk (*), the arithmetic used is in twos complement. For signals denoted by an asterisk, the arithmetic convention is straight (un-signed) binary. The bit width of all signal lines or buses greater than one bit is signified by a diagonal hash mark (\) drawn through the line with a number written above the hash mark signifying the number of bits. If a hash mark is not present, then the signal line is one bit wide. Signal delay values are illustrated in two ways. For boxes containing a Z-transform representation, the delay equals a number of clock cycles equal to the magnitude of the Z-transform exponent. For boxes having a square with a number in it at the lower right hand corner, the number indicates the processing delay in clock cycles. If no delay is indicated for a circuit element, then the element processing time is negligible compared to a clock cycle.

In FIG. 5, input terminals 52 and 54 and output terminals 56 and 58 use the same designators as in the example of FIG. 3. Terminals 52 and 54 are coupled, as in the previous example, to receive the chroma vector components Uin and Vin from separator 30 and outputs 56 and 58 represent the output of the overload circuit providing the processed output signals Uout and Vout.

Controllable gain amplifiers 60 and 62 of the previous example are implemented in this example of the invention by two digital signal processing channels or paths 510 and 520 which control the amplitude of the U and V chroma components. Path 510 comprises multiplier 512 having an input coupled by two-clock delay unit 511 to input 52 for receiving chroma vector U and having an output coupled via limiter 513 and symmetrical rounding unit 514 to output 56. Path 520 is identical to path 510 and comprises delay unit 521, multiplier 522, limiter 523 and symmetrical rounding unit 524 coupled in series from input 54 to output 58.

The inclusion of the symmetrical rounding units in the U and V signal paths advantageously ensures that the bit reduction of 18 to 12 bits for the output signals does not introduce any significant "rounding error" in the chroma vectors Uout and Vout. Such a "rounding error" may produce a DC shift in the output signals and so may produce an undesired tint shift. Symmetrical rounding, as used here, prevents any significant error and any significant tint shift due to rounding. Examples of rounding circuits, suitable for use in the present invention for the purpose of ensuring tint integrity during limiting, are described, for example, by Hague et al. in U.S. Pat. No. 5,696,710 which issued Dec. 9, 1997.

Control of the gain of multipliers 512 and 522 in the U and V signal processing paths 510 and 520 is provided by gain control circuit 530 (outlined in phantom) which includes magnitude approximation unit 78A and look-up table unit 72A which provide similar functions to units 78 and 72 of the previous example and which provide additional features of the invention as well.

In circuit 530, the magnitude approximation (or arithmetic processing) unit 78A has inputs 80 and 82 coupled to receive component vector signals V and U provided by separator 30 as previously explained and has output 76 coupled via limiter 79 to a control or address input of look-up table unit 72A the output of which is coupled via inhibit gate 503 to gain control output terminal 502. Output 502 applies a gain control signal G developed in look up table 72A in common to multipliers 512 and 522 in the U and V signal processing paths 510 and 520. Since the same signal is applied to both multipliers, the amplitudes of the two chroma vectors U and V are controlled in direct proportion to any change in the gain control signal, G.

The remaining elements of gain control circuit 530 comprise plurality of additional input terminals 541–544 and OR gate 550 which facilitate further features of the invention including selection of limiting characteristics and output signal inhibiting. Input 541, for example, is provided for receiving a table selection signal, TS, from a suitable source and for applying the table selection signal to table selection input 505 of look up table unit 72A. Exemplary tables include a table for hard "clipping" or limiting and a table providing "soft" clipping or limiting of the gain control signal supplied to the multipliers. Examples of these tables are discussed later with regard to FIGS. 6B and 7B.

Input terminals 542, 543 and 544 are provided for receiving inhibit input signals for reducing the gain of chroma component vector processing channels 510 to zero under certain circumstances. Specifically, these input signals may comprise, illustratively, a "color off" control signal, a "sync gate" indicator signal and a "color killer" input signal and are applied to the inhibit input of gate 503 via OR gate 550 so that if any signal is present, gate 503 will be inhibited and multipliers 512 and 522 in chroma vector component paths 510 and 520 will therefore reduce the path gain to zero thus preventing the vectors U and V from reaching outputs 56 and 58.

In the discussion of the present invention it was noted that the saturation value could be calculated exactly using the function that the vector C is equal to the square root of the sum of the squares of the component vectors U and V or a suitable approximation thereof. In the example of FIG. 5, the magnitude is approximated using the formula indicated wherein "a" and "b" correspond to the U and V vector components of the chroma signal C. In this formula C is found by summing the magnitudes of "a" and "b" with the maximum (MAX) value of the absolute values of "a" and "b", multiplying the sum by 3 and dividing the result by 256.

For the 12 bit input signals shown, and the scaling factors selected, this results in a 7 bit output signal that is reduced to 6 bits by limiter 79. Advantageously, the approximation used has been found to be accurate to within about twelve percent and is very easy to implement as compared to the exact calculation of the square root of the sum of the squares. The gain factor of 3/128 is used to map the magnitude approximation into a useful range for gain characteristic block 72A as discussed later.

It will be noted that the bit reduction provided by limiter 79 is not strictly necessary because it is quite unlikely that the output of unit 78A will ever reach a full 7 bits. This is because the chroma components are to a certain degree correlated and it is not likely that both will reach maximums at the same time for any given pixel. One might, therefore, eliminate limiter 79. It may be included, however, as a matter of good engineering practice to ensure that under no circumstances, including even unlikely ones, that chroma will experience overload in the system.

As noted above, look up tables are used to implement gain characteristic block 72A. Two tables are provided, a "hard-clip" or "hard limit" table and a "soft clip" or "soft limit" table. As mentioned, the choice of table is selected by table selection signal TS applied to input 541. This control could be provided by a user of apparatus employing the described chroma overload protector but, as a practical matter, the choice of look up tables is more likely to be provided by a manufacturer based upon the needs of particular television apparatus being designed. For example, one table might be more appropriate for chroma processing prior to signal source selection in a television apparatus and a different table might be a more appropriate choice with regard to chroma signal processing which may be done after input signal selection.

Figure 6A:
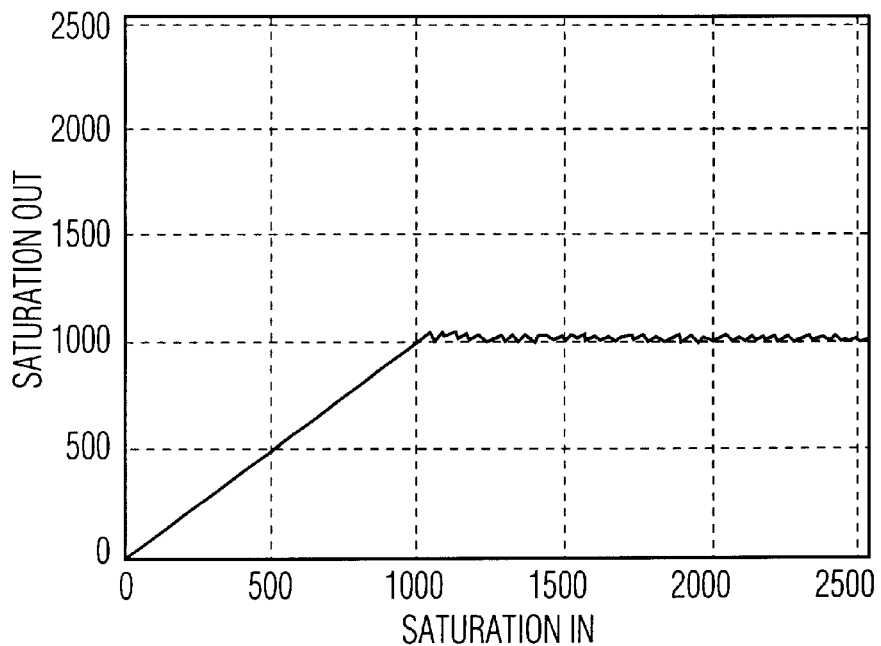
FIGS. 6A, 6B, 7A and 7B are diagrams illustrating exemplary signal transfer characteristics of certain elements of the apparatus of FIG. 5.
Figure 6B:
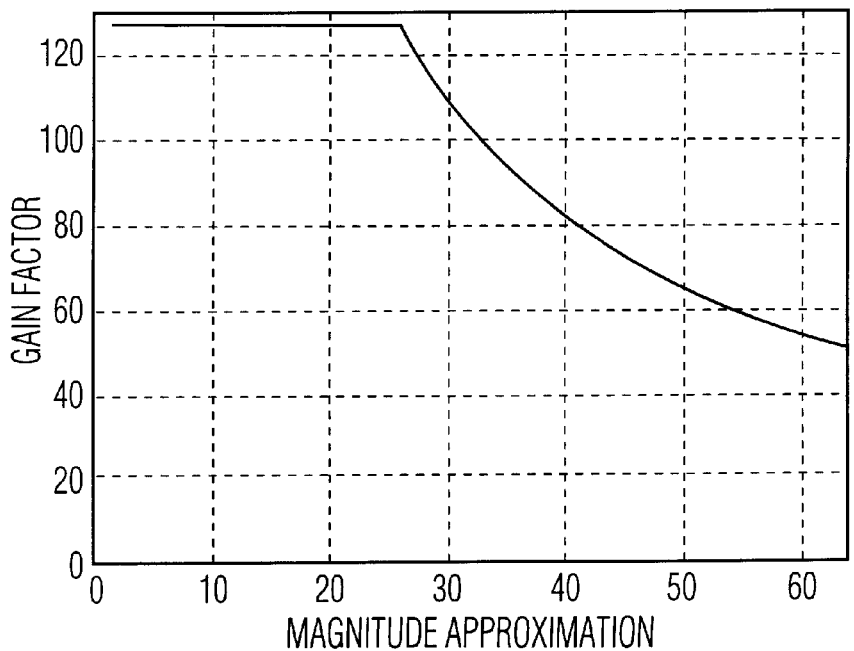
Figure 7A:
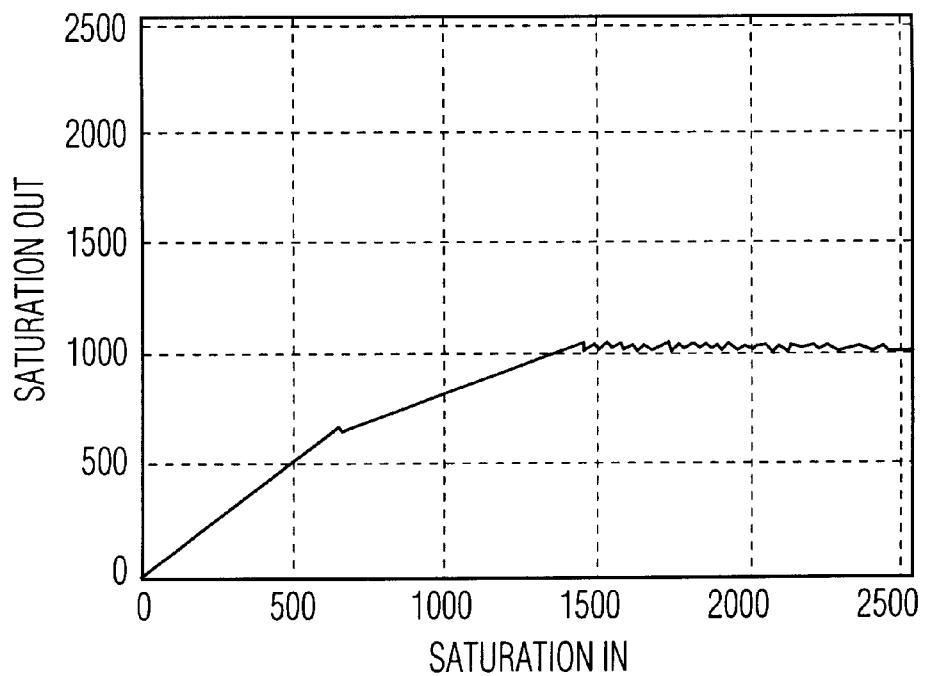

FIGS. 6A, 6B, 7A and &B provide further details with regard to table look up unit 72A. It is helpful to an understanding of this aspect of the invention that the look up tables are "saturation-in/gain-out" tables. In order to generate the look up table entries, the desired "saturation-in/saturation-out" characteristics are first determined. These characteristics may then be converted to the required look up table entries by using the relationship:

$$\text{gain} = (\text{saturation out})/(\text{saturation in})$$

Figure 7B:
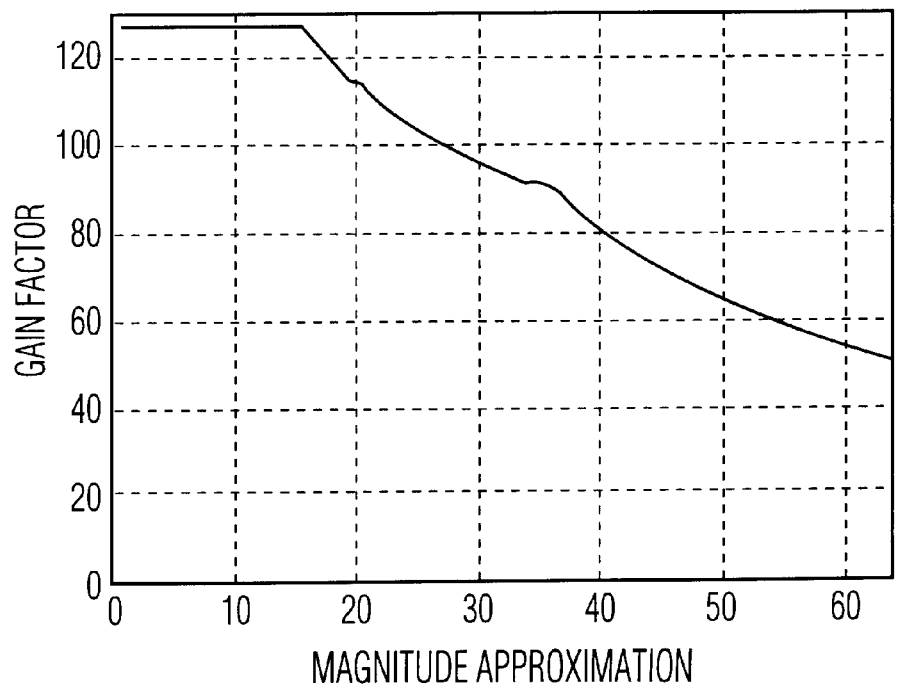

Referring now to the saturation table of FIG. 6A (the hard clipping case), the ordinate and abscissa are expressed in bits of the chrominance signal vector. From zero up to 1023 bits the desired response is linear (no limiting or clipping desired) and after that it is limited to an output of 1023 bits. For the system gain and scale factors used, this point of limiting occurs at a saturation level of 100% (see the locus of points 400 in FIG. 4B) and this is the maximum value for the overall vector sum of the component vectors Uout and Vout. Accordingly, after allowance for a bit reduction to 7 bits, the "gain out/saturation in" table of FIG. 6B may be constructed to provide a gain output level of a constant value (127 bits) up to the limit level and a decreasing level thereafter. FIGS. 7A and 7B are similar for the "soft clipping" case except that in this case the saturation in vs saturation out table is piece-wise approximated up to the limiting value by two line segments, the first having a linear slope for linear response below limiting and the second having about half that slope to begin the limiting process earlier. This results, as shown in FIG. 7B, in a look up table which begins reducing gain earlier than in the previous example. Advantageously, the use of the soft-clipping characteristic (FIG. 7B) allows the nominal chroma level into the chroma overload circuit to be increased. (Note that this can be adjusted via the automatic chroma control ACC setting). This has been found to improve the appearance of under-saturated video without degrading normal or over-saturated video.

It will be apparent to those skilled in the art that although the present invention has been described in terms of an exemplary embodiment, modifications and changes may be made to the disclosed embodiment without departing from the essence of the invention. Therefore, it is to be understood that the present invention is intended to cover all modifications as would fall within the true scope and spirit of the present invention.

What is claimed is:

1. Chroma overload apparatus, comprising:
    a source for providing a chrominance signal having first and second vector components;
    a separator, coupled to said source, for separating said chrominance signal into said first vector component and said second vector component; and
    an overload compensator, coupled to said separator, for adjusting the magnitude of said first and second vector components as a function of a detected saturation level of the chrominance signal on a pixel by pixel basis.

2. Apparatus as recited in claim 1, wherein said overload compensator comprises:
    a saturation calculator responsive to said first and second vector components for providing a saturation indicating signal;
    a converter responsive to said saturation indicating signal for providing a gain control signal; and
    gain control means responsive to said gain control signal for concurrently adjusting the gain of said first vector component in a first signal path and of said second vector component in a second signal path.

3. Apparatus as recited in claim 2, wherein said converter comprises:
    means for scaling and selectively applying hard limiting or soft limiting to said saturation indicating signal to provide said gain control signal.

4. Apparatus as recited in claim 3, wherein said gain control means includes means for symmetrically rounding the gain adjusted vector components of each signal path.

5. Chroma overload protection apparatus, comprising:
    a source for providing a chroma signal;
    a chroma signal separator for separating said chroma signal into a first vector component and a second vector component;
    a first signal path including a first multiplier and a first symmetrical rounding unit for processing said first vector component;
    a second signal path including a second multiplier and a second symmetrical rounding unit for processing said second vector component;
    a saturation calculator responsive to said first and second vector components for providing a saturation indicating signal;
    a look-up table, responsive to said saturation indicating signal, for providing a gain control signal; and
    means for applying said gain control signal in common to each of said multipliers for concurrently adjusting the gain of said first vector component in said first signal path and said second vector component in said second signal path.

6. Apparatus as recited in claim 5, further comprising:
    a source for supplying a table selection signal to an input of said look-up table for selecting a first table representing a hard limiting characteristic when said selection signal is of a first value and for selecting a second table representing a soft limiting characteristic when said selection signal is of a second value.

7. Apparatus as recited in claim 5, wherein said saturation calculator exhibits a first delay and said look-up table exhibits a second delay and further comprising:
    a respective delay means in each signal path prior to the multiplier in the path, said delay means having a delay equal to the sum of said first and second delays.

8. Apparatus as recited in claim 5, further comprising:
    an automatic chroma control unit for applying said chroma signal to said chroma signal separator for stabilizing the average amplitudes of said vector components prior to the processing thereof in said first and second signal paths.

9. Apparatus as recited in claim 5, further comprising:
    inhibit means responsive to an inhibit signal supplied thereto for reducing the amplitude of the chroma vector components appearing at the outputs of each of said signal paths to zero when said inhibit signal is present; and
    a source for providing said inhibit signal.

10. A method for providing chroma overload protection, comprising the steps of:
    providing a chrominance signal having first and second vector components;
    separating said chrominance signal into said first vector component and said second vector component; and
    adjusting the magnitude of said first and second vector components as a given function of a detected saturation level of the chrominance signal on a pixel by pixel basis.

11. A method as recited in claim 10, wherein the step of adjusting comprises:
    generating a saturation indicating signal from said first and second vector components;
    converting said saturation indicating signal into a gain control signal; and
    adjusting the amplitudes of said first vector component in a first signal path and of said second vector component in a second signal path in accordance with said gain control signal.

12. A method as recited in claim 11, wherein the step of adjusting comprises:
    multiplying said first vector component in said first signal path by said gain control signal and symmetrically rounding the result; and
    multiplying said second vector component in said second signal path by said gian control signal and symmetrically rounding the result.

13. A method as recited in claim 12, further comprising the step of:
    stabilizing the average amplitude of said chroma signal prior to the step of separation of said chroma signal into said vector components.

* * * * *